(12) United States Patent
Chin et al.

(10) Patent No.: US 8,908,672 B2
(45) Date of Patent: Dec. 9, 2014

(54) UPLINK SYNCHRONIZATION IN A MULTI-SIM USER EQUIPMENT

(71) Applicants: Tom Chin, San Diego, CA (US); Kuo-Chun Lee, San Diego, CA (US); Ian J. Fevrier, San Diego, CA (US); Peng Li, San Diego, CA (US); Danlu Zhang, San Diego, CA (US); Guangming Shi, San Diego, CA (US)

(72) Inventors: Tom Chin, San Diego, CA (US); Kuo-Chun Lee, San Diego, CA (US); Ian J. Fevrier, San Diego, CA (US); Peng Li, San Diego, CA (US); Danlu Zhang, San Diego, CA (US); Guangming Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/777,539

(22) Filed: Feb. 26, 2013

(65) Prior Publication Data

US 2014/0064117 A1    Mar. 6, 2014

Related U.S. Application Data

(60) Provisional application No. 61/695,013, filed on Aug. 30, 2012, provisional application No. 61/695,004, filed on Aug. 30, 2012.

(51) Int. Cl.
*H04J 3/06* (2006.01)

(52) U.S. Cl.
USPC .......................................... 370/350; 370/509

(58) Field of Classification Search
USPC ................... 370/252, 328, 350, 509
See application file for complete search history.

(56) References Cited

U.S. PATENT DOCUMENTS

| | | | |
|---|---|---|---|
| 2009/0239582 A1 | 9/2009 | Lin | |
| 2011/0117962 A1* | 5/2011 | Qiu et al. | 455/558 |
| 2011/0237297 A1* | 9/2011 | Shin | 455/558 |
| 2012/0004013 A1 | 1/2012 | Esch et al. | |
| 2012/0040672 A1 | 2/2012 | Chin et al. | |
| 2012/0142348 A1* | 6/2012 | Park et al. | 455/435.1 |
| 2013/0065644 A1* | 3/2013 | Bishop et al. | 455/558 |
| 2013/0079000 A1* | 3/2013 | Syrjarinne et al. | 455/427 |
| 2013/0094452 A1* | 4/2013 | Pavlovski et al. | 370/329 |
| 2013/0150032 A1* | 6/2013 | Pattaswamy et al. | 455/434 |

OTHER PUBLICATIONS

International Search Report and Written Opinion—PCT/US2013/057710—ISAEPO—Nov. 25, 2013.

* cited by examiner

*Primary Examiner* — Andrew Lee
(74) *Attorney, Agent, or Firm* — Kristine U. Ekwueme

(57) ABSTRACT

A method of wireless communication in a dual subscriber identification module (SIM) terminal includes transmitting a first synchronization message from a first module associated with a first SIM. The method also includes receiving a first acknowledgment (ACK) message on a fast physical access channel (FPACH) in response to the first synchronization message. The method further includes sharing timing information included in the first ACK between the first module and a second module.

26 Claims, 9 Drawing Sheets

UPLINK SYNCHRONIZATION IN A MULTI-SIM USER EQUIPMENT

CROSS-REFERENCE TO RELATED APPLICATION

This application claims the benefit of U.S. Provisional Patent Application No. 61/695,013 filed on Aug. 30, 2012, entitled "SELECTIVE UPLINK SYNCHRONIZATION IN A MULTI-SIM USER EQUIPMENT," and U.S. Provisional Patent Application No. 61/695,004 filed on Aug. 30, 2012, entitled "UPLINK SYNCHRONIZATION IN A MULTI-SIM USER EQUIPMENT," the disclosures of which are expressly incorporated by reference herein in their entireties.

This application is related to U.S. patent application Ser. No. 12/855,511 filed on Aug. 12, 2010, in the names of CHIN et al., and U.S. patent application Ser. No. 13/087,232 filed on Apr. 14, 2011, in the names of CHIN et al., the disclosures of which are expressly incorporated by reference herein in their entireties.

BACKGROUND

1. Field

Aspects of the present disclosure relate generally to wireless communication systems, and more particularly, to uplink synchronization in a multi-SIM user equipment (UE) in a TD-SCDMA network.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA), that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

According to an aspect of the present disclosure, a method of wireless communication in a dual subscriber identification module (SIM) terminal is presented. The method includes transmitting a first synchronization message from a first module associated with a first SIM. The method also includes receiving a first acknowledgment (ACK) message on a fast physical access channel (FPACH) in response to the first synchronization message. The ACK message includes timing information. The method also includes sharing the timing information between the first module and a second module.

Another aspect of the present disclosure discloses an apparatus including means for transmitting a first synchronization message from a first module associated with a first SIM. The apparatus also includes means for receiving a first ACK message on a FPACH in response to the first synchronization message. The ACK message includes timing information. The apparatus further includes means for sharing the timing information between the first module and a second module.

In another aspect of the present disclosure, a computer program product for wireless communications in a wireless network having a non-transitory computer-readable medium is disclosed. The computer readable medium has non-transitory program code recorded thereon which, when executed by the processor(s), causes the processor(s) to transmit a first synchronization message from a first module associated with a first SIM. The program code also causes the processor(s) to receive a first ACK message on a FPACH in response to the first synchronization message. The ACK message includes timing information. The program code further causes the processor(s) to share the timing information between the first module and a second module.

In another aspect of the present disclosure, a wireless communication apparatus has a memory and at least one processor coupled to the memory. The processor(s) is configured to transmit a first synchronization message from a first module associated with a first SIM. The processor(s) is also configured to receive a first ACK message on a FPACH in response to the first synchronization message. The ACK message includes timing information. The processor(s) is further configured to share the timing information between the first module and a second module.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
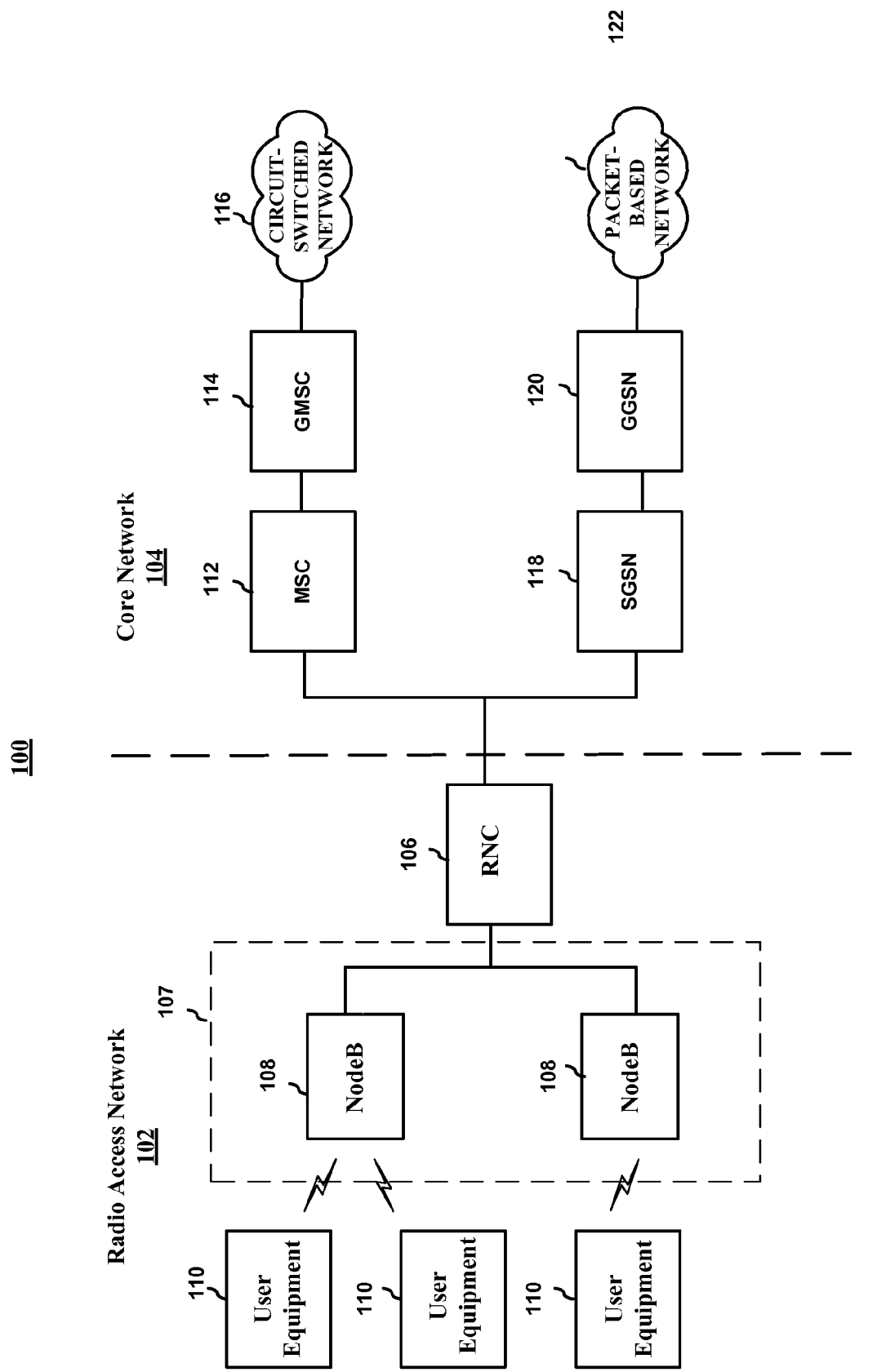
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
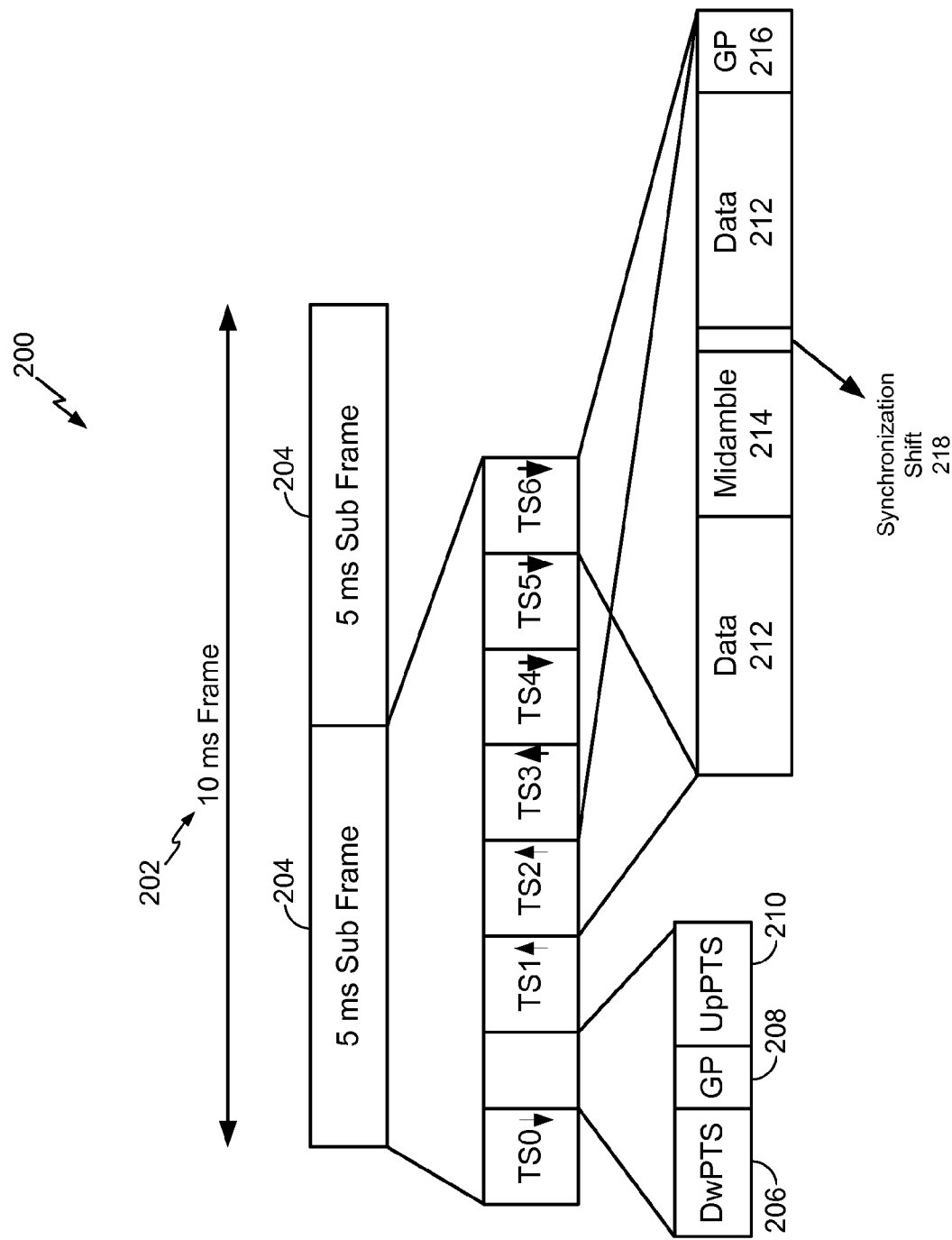
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Synchronization Shift (SS) bits 218. Synchronization Shift bits 218 only appear in the second part of the data portion. The Synchronization Shift bits 218 immediately following the midamble can indicate three cases: decrease shift, increase shift, or do nothing in the upload transmit timing. The positions of the SS bits 218 are not generally used during uplink communications.

Figure 3:
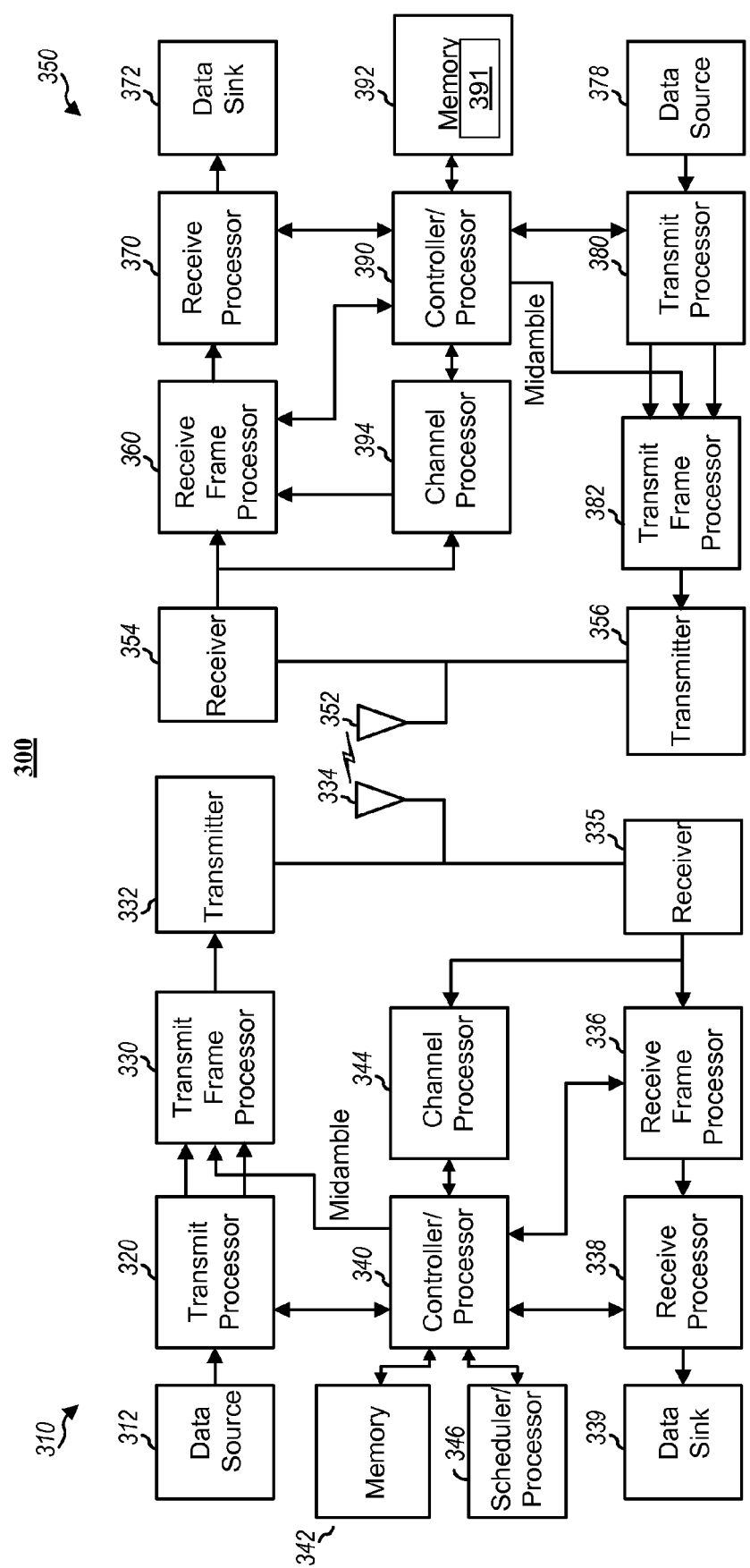
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 350 may store an uplink synchronization module 391 which, when executed by the controller/processor 390, configures the UE 350 for sharing timing information received in response to a uplink synchronization code. A scheduler/processor 346 at the node B 310 may be used to allocate resources to the UEs and schedule downlink and/or uplink transmissions for the UEs.

Uplink Synchronization in a Multi-SIM User Equipment

A time division synchronous code division multiple access (TD-SCDMA) network uses time division and code division to allow multiple UEs to share a radio bandwidth on a particular frequency channel. Specifically, the downlink and uplink transmissions share the same bandwidth in different time slots (TSs).

As shown in FIG. 2, a TD-SCDMA frame may use time slots (TSs) for the traffic and signaling. In the TD-SCDMA frame, a downlink pilot channel (DwPCH) may transmit the pilot signal for the cell. Additionally, an uplink pilot channel (UpPCH) may be used for performing an initial random access procedure and uplink synchronization.

A TD-SCDMA network may specify the uplink synchronization for various procedures, such as a handover or an initial power on. That is, in TD-SCDMA systems, different UEs may synchronize on an uplink pilot channel so that a node B may simultaneously receive the signals transmitted from the different UEs. Specifically, each UE may transmit an uplink synchronization (SYNC—UL) code to the node B and the node B may measure a received timing from the uplink synchronization. After measuring the received timing, the node B may transmit the timing information via an acknowledgement (ACK) message on a physical access channel, such as the fast physical access channel (FPACH).

In one configuration, the ACK message may be a high level message, such as a level one message. Furthermore, the ACK message may be a point to point message, such as a unicast message. Moreover, in one configuration, the ACK message may further include power information in addition to the timing information. The ACK message may sometimes be referred to as an ACK response.

TABLE I is an example of the fast physical access channel ACK message.

TABLE I

| Field | Length | Description |
| --- | --- | --- |
| Signature Reference Number | 3 (MSB) | Indicate SYNC_UL code |
| Relative Sub-Frame Number | 2 | Sub-Frame number preceding the ACK |
| Received starting position of the UpPCH (UpPCHPOS) | 11 | Used for timing correction |
| Transmit Power Level Command for RACH message | 7 | Used for power level in PRACH |
| Reserved bits | 9 (LSB) | N/A |

In some cases, a user equipment (UE) may have more than one subscriber identification module (SIM). The multiple SIMs allow the UE to place a phone call or receive a phone call using different phone numbers (i.e., one phone number for each SIM). Furthermore, each SIM may be associated with a unique international mobile subscriber identity (IMSI) for the UE. It should be noted that in the present disclosure a SIM may also refer to a universal SIM (USIM).

In some cases, in a multi-SIM UE, the aforementioned uplink synchronization may be performed for each SIM that has an established call. Additionally, during a power on procedure, the UE may perform an uplink synchronization for the initial access procedure of each SIM. Specifically, the UE may transmit an uplink synchronization for each module associated with a SIM and may receive a response on the physical access channel for each module. Accordingly, the multiple uplink synchronizations may increase the UE's power consumption and CPU processing. Furthermore, the multiple uplink synchronizations may also increase the number of messages exchanged in the network. Thus, it is desired to decrease the power consumption and processing for the multi-SIM UE. It is also desired to decrease the number of messages exchanged in the network. It should be noted that in the present disclosure, the term UE may refer to a multi-SIM UE.

According to an aspect of the present disclosure, a UE may transmit multiple uplink synchronizations (e.g., one uplink synchronization for each module associated with a SIM) and may use the first received timing information response on a physical access channel to control the other modules. Specifically, the module that is the first to receive a response from the node B shares the response with the other module so that the other modules may adjust their power and/or uplink timing. Responses received after the first received response may be received later due to a delay or transmission failure. According to one configuration, the uplink synchronization codes for the various SIMs may be simultaneously transmitted via the same uplink channel pilot channel.

Figure 4:
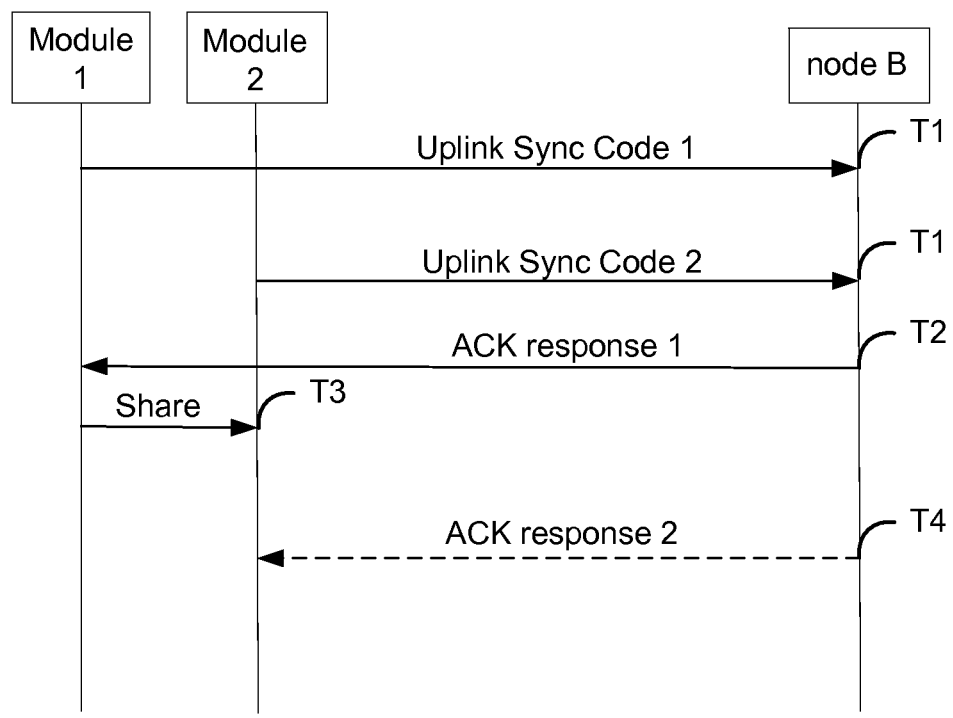
FIGS. 4-7 are call flow diagrams for communications in a wireless network according to aspects of the present disclosure.

FIG. 4 illustrates a call flow diagram for uplink synchronization according to an aspect of the present disclosure. As shown in FIG. 4, at time T1, each module of the UE may simultaneously transmit an uplink synchronization code (uplink sync code 1 and uplink sync code 2) to the node B. At time T2, the node B may transmit a first ACK response (ACK response 1) including timing information in response to one of the transmitted uplink synchronization codes. The response of time T2 may be transmitted on a physical access channel, such as a fast physical access channel. At time T3, the module (module 1) that was the first to receive an ACK response may share the timing information of the received ACK response (ACK response 1) with the other modules (module 2) of the UE. At time T4, the other modules (module 2) may receive a second ACK response (ACK response 2) including timing information in response to the other transmitted uplink synchronization codes. The timing information of the second ACK response may be ignored because the timing information of the first ACK response was shared between the modules.

As shown in FIG. 4, in one configuration, at time T3, the module that receives the first ACK response shares the timing information prior to the other module receiving the second ACK response. In another configuration, the timing information may be shared after the subsequent ACK response(s) have been received.

In some cases, the uplink synchronization code transmitted for each SIM may collide as a result of the simultaneous transmission. According to another configuration, to mitigate a potential collision, the modules of the UE may transmit the uplink synchronization code at different times (e.g., different subframes). According to yet another configuration, to mitigate a potential collision, the modules of the UE may use different uplink synchronization codes while using the same uplink pilot channel.

Figure 5:
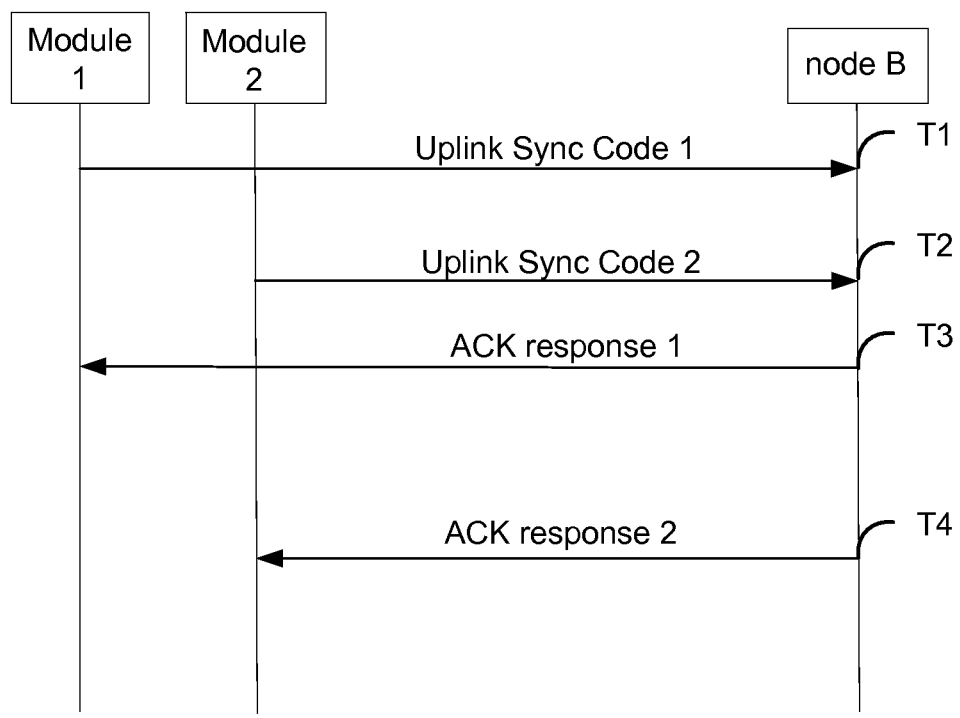

FIG. 5 illustrates a call flow diagram for transmitting uplink synchronization codes according to an aspect of the present disclosure. As shown in FIG. 5, at times T1 and T2, each module of the UE may transmit an uplink synchronization code (uplink sync code 1 and uplink sync code 2) to the node B. In one configuration, the uplink synchronization codes (uplink sync code 1 and uplink sync code 2) may be the same code. In another configuration, the uplink synchronization codes may be different codes. The uplink synchronization codes may be transmitted at different times using different frames of an uplink pilot channel or may be transmitted at the same time using the same uplink pilot channel.

At time T3, the node B may transmit a first ACK response (ACK response 1) including timing information in response to one of the transmitted uplink synchronization codes. At time T4, the node B may transmit a second ACK response (ACK response 2) including timing information in response to one of the transmitted uplink synchronization codes. The first and second ACK responses of times T3 and T4 may be transmitted on a physical access channel such as a fast physical access channel.

In one configuration, the first received ACK response, such as the first ACK response of time T3 may be shared with other modules (not shown). Alternatively, in another configuration, the first received ACK response may not be shared and each module may use the timing information of their respective ACK response (as seen in FIG. 5).

According to another aspect of the present disclosure, a UE may selectively transmit an uplink synchronization code and process an ACK message for multiple SIMs in an uplink synchronization procedure. That is, according to one configuration, the UE may transmit the uplink synchronization code for a module experiencing a signal quality that is better than the signal quality of other modules of the UE.

Specifically, the signal quality for each module of the UE may be different because each module may use a different antenna and/or radio frequency (RF) chain. The signal quality may be measured by a signal power, such as a received signal code power (RSCP), of a physical control channel, such as a primary common control physical channel (P-CCPCH). Thus, in the present configuration, the UE may transmit the uplink synchronization code using the module experiencing the best signal quality. Furthermore, the module that transmits the uplink synchronization code may share the received timing information with the other modules of the UE.

As previously discussed, the ACK message may be a high level message, such as a level one message. Furthermore, the ACK message may be a point to point message, such as a unicast message. The ACK message may sometimes be referred to as an ACK response.

Transmitting the uplink synchronization code based on signal quality may reduce the number of transmitted signals because the node B may improve timing measurements as a result of the improved signal quality. Furthermore, the number of transmitted signals may be reduced because only one of the multiple modules of the UE may transmit the uplink synchronization code.

Figure 6:
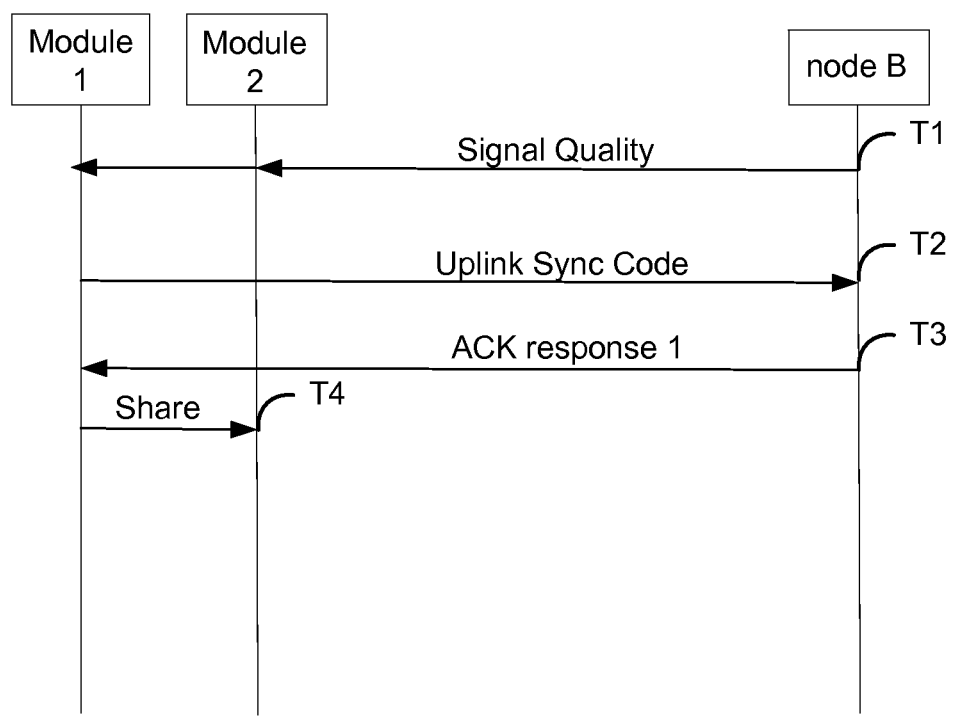

FIG. 6 illustrates a call flow diagram for selective uplink transmissions according to an aspect of the present disclosure. As shown in FIG. 6, at time T1, each module of the UE may measure the signal quality, (e.g., power of a physical control channel, such as the primary common control physical channel). At time T2, the module having the best signal quality may transmit an uplink synchronization code (uplink sync code) to the node B. In this example, module 1 experiences better signal quality. At time T3, the node B may transmit an ACK response including the timing information in response to the transmitted uplink synchronization code. The ACK response of time T3 may be transmitted on a physical access channel, such as a fast physical access channel. At time T4, the module (module 1) that received the ACK response may share the timing information of the received ACK response with the other modules (module 2) of the UE.

According to another configuration, the UE may alternate the transmission of the uplink synchronization code between the modules of the UE. Furthermore, the UE may share the received ACK response with the modules that did not transmit the uplink synchronization code.

Figure 7:
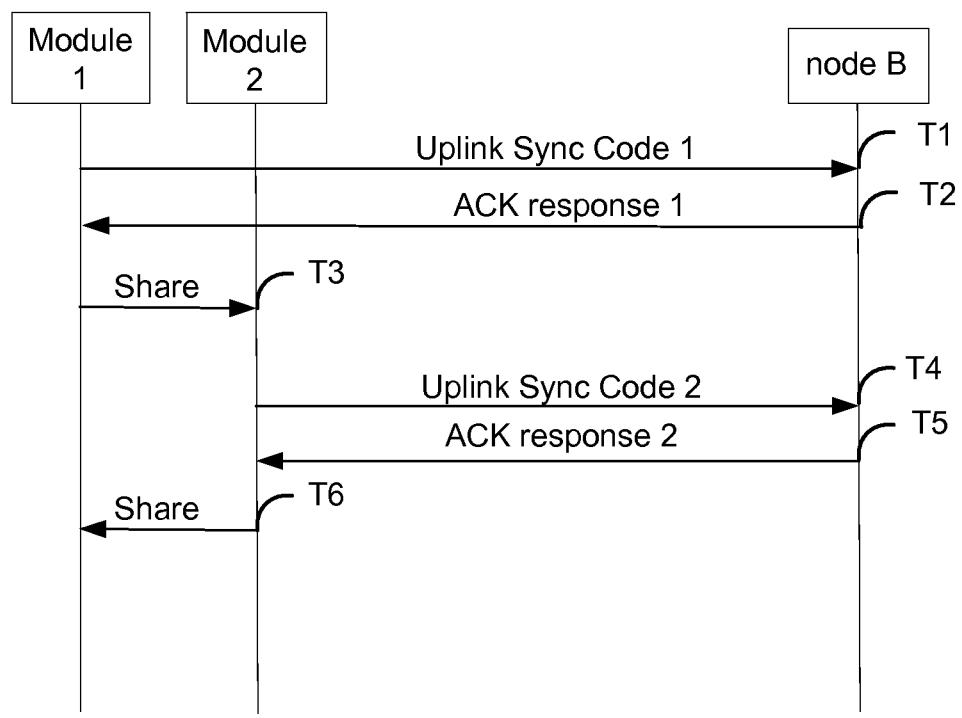

FIG. 7 illustrates a call flow diagram for alternating uplink synchronization codes according to aspects of the present disclosure. As shown in FIG. 7, at time T1, a first module (module 1) of the UE may transmit a first uplink synchronization code (uplink sync code 1) to the node B. At time T2, the node B may transmit a first ACK response (ACK response 1) including timing information in response to the first uplink synchronization code. At time T3, the first module may share the timing information with a second module (module 2) of the UE.

At time T4, the second module of the UE may transmit a second uplink synchronization code (uplink sync code 2) to the node B. At time T5, the node B may transmit a second ACK response (ACK response 2) including timing information in response to the second uplink synchronization code. The ACK responses of times T2 and T5 may be transmitted on a physical access channel, such as a fast physical access channel. At time T6, the second module may share the timing information with a first module of the UE.

Aspects of the present disclosure have been presented for a TD-SCDMA network. Still, the present disclosure is not limited to a TD-SCDMA network and is contemplated for other types of networks/systems, such as a LTE TDD system. Additionally, aspects of the present disclosure have been presented with the ACK response including timing information. Still, in another configuration the ACK response may further include power information. Additionally, when the ACK response includes timing and power information, the module that receives the ACK response may selectively share either the timing information or the power information. Furthermore, in another configuration, the ACK response may only include power information.

Figure 8:
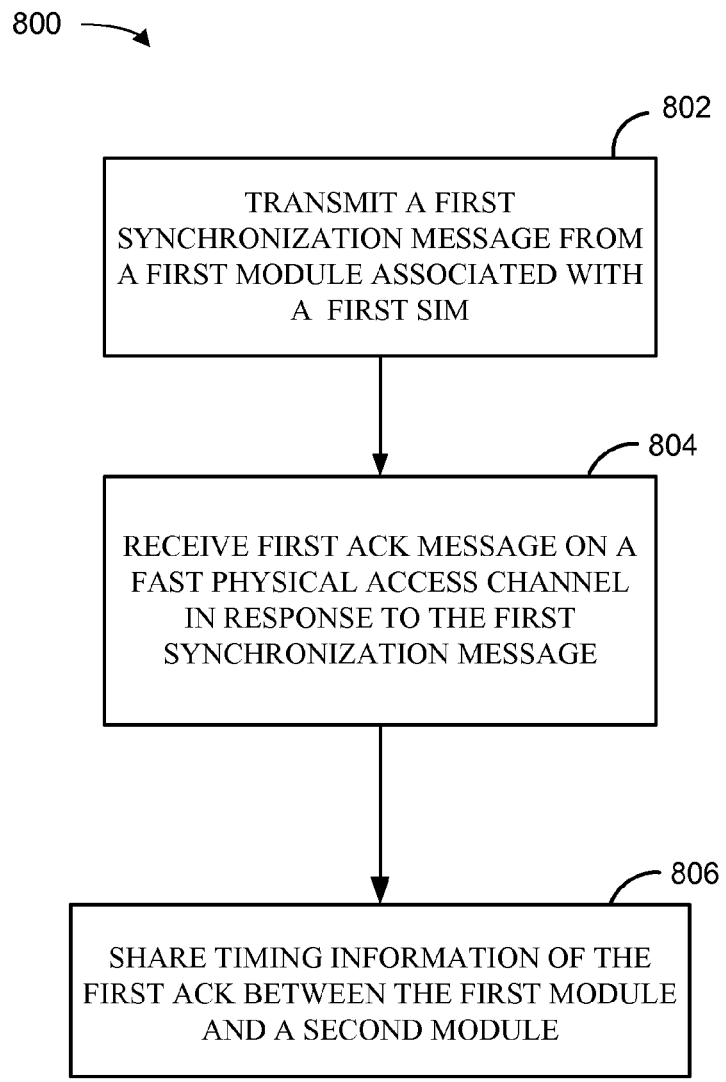
FIG. 8 is a block diagram illustrating a method for uplink synchronization according to one aspect of the present disclosure.

FIG. 8 shows a wireless communication method 800 according to one aspect of the disclosure. A UE transmits a first synchronization message from a first module associated with a first SIM, as shown in block 802. Additionally, the UE also receives a first ACK message on a fast physical access channel in response to the first synchronization message, as shown in block 804. Finally, as shown in block 806, the UE shares the timing information of the first ACK message between the first module and a second module.

Figure 9:
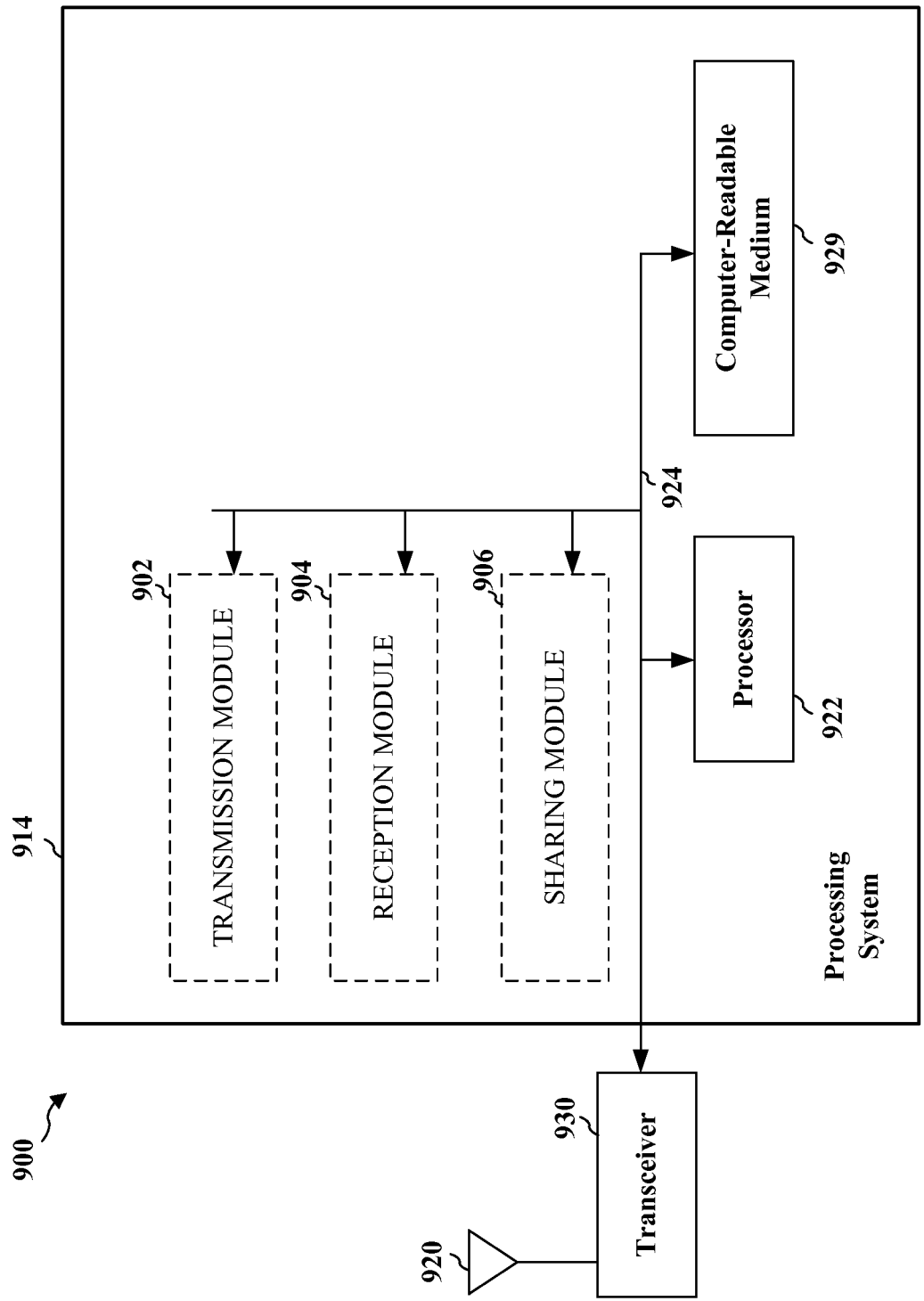
FIG. 9 is a diagram illustrating an example of a hardware implementation for an apparatus employing a processing system according to one aspect of the present disclosure.

FIG. 9 is a diagram illustrating an example of a hardware implementation for an apparatus 900 employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 922 the modules 902, 904, 906, and the computer-readable medium 929. The bus 924 may also link various other circuits such as timing sources, peripherals, voltage regulators, and power management circuits, which are well known in the art, and therefore, will not be described any further.

The apparatus includes a processing system 914 coupled to a transceiver 930. The transceiver 930 is coupled to one or more antennas 920. The transceiver 930 enables communicating with various other apparatus over a transmission medium. The processing system 914 includes a processor 922 coupled to a computer-readable medium 929. The processor 922 is responsible for general processing, including the execution of software stored on the computer-readable medium 929. The software, when executed by the processor 922, causes the processing system 914 to perform the various functions described for any particular apparatus. The computer-readable medium 929 may also be used for storing data that is manipulated by the processor 922 when executing software.

The processing system 914 includes a transmission module 902 for transmitting a first synchronization message from a first module associated with a first SIM. The transmission module 902 may also transmit a second synchronization message from a second module associated with a second SIM. The processing system 914 includes a reception module 904 for receiving an ACK message on a fast physical access channel in response to the first synchronization message and/or second synchronization message, the ACK message comprising at least timing information. Furthermore, the processing system 914 may also include a sharing module 906 for sharing the timing information between the first module and the second module. The modules may be software modules running in the processor 922, resident/stored in the computer-readable medium 929, one or more hardware modules coupled to the processor 922, or some combination thereof. The processing system 914 may be a component of the UE 350 and may include the memory 392, and/or the controller/processor 390.

In one configuration, an apparatus such as a UE is configured for wireless communication including means for transmitting, means for receiving, and means for sharing. In one aspect, the transmitting means may be the antennas 352, the transmitter 356, the transmit frame processor 382, the transmit processor 380, the controller/processor 390, the memory 392, uplink synchronization module 391, transmission module 902, and/or the processing system 914 configured to perform the functions recited by the aforementioned means. The receiving means may be e the antennas 352, the receiver 354, the channel processor 394, the receive frame processor 360, the receive processor 370, the controller/processor 390, the memory 392, uplink synchronization module 391, reception module 904, and/or the processing system 914. The sharing means may be the controller/processor 390, the memory 392, uplink synchronization module 391, sharing module 906, and/or the processing system 914. In another aspect, the aforementioned means may be a module or any apparatus configured to perform the functions recited by the aforementioned means.

Several aspects of a telecommunications system has been presented with reference to TD-SCDMA systems. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication in a dual subscriber identification module (SIM) terminal; the method comprising:
   transmitting a first synchronization message from a first module associated with a first SIM;
   receiving a first acknowledgment (ACK) message on a fast physical access channel (FPACH) in response to the first synchronization message, the ACK message comprising at least timing information; and
   sharing the timing information between the first module and a second module.

2. The method of claim 1, further comprising:
   transmitting a second synchronization message from the second module associated with a second SIM; and
   receiving a second ACK message on the FPACH in response to the second synchronization message, the second ACK message being received after the first ACK message.

3. The method of claim 2, in which the first and second synchronization messages are simultaneously transmitted.

4. The method of claim 3, in which the first and second synchronization messages use different synchronization codes.

5. The method of claim 2, in which the first and second synchronization messages are transmitted at different times.

6. The method of claim 2, in which the sharing is performed when the first and second synchronization messages are simultaneously transmitted and when the first and second synchronization messages use similar synchronization codes.

7. The method of claim 2, further comprising alternating transmitting the first synchronization message and the second synchronization message.

8. The method of claim 1, further comprising:
   monitoring a first signal quality associated with the first SIM; and
   monitoring a second signal quality associated with a second SIM;
   the first synchronization message being transmitted when the first signal quality is better than the second signal quality.

9. The method of claim 1, in which the ACK message further includes power information; and
   the method further includes adjusting a transmission power for each SIM based at least in part on the received power information.

10. The method of claim 1, in which the ACK message is a point to point message and/or a high level message.

11. A apparatus for wireless communication in a dual subscriber identification module (SIM) terminal; the apparatus comprising:
    means for transmitting a first synchronization message from a first module associated with a first SIM;
    means for receiving a first acknowledgment (ACK) message on a fast physical access channel (FPACH) in response to the first synchronization message, the ACK message comprising at least timing information; and
    means for sharing the timing information between the first module and a second module.

12. The apparatus of claim 11, further comprising:
    means for transmitting a second synchronization message from the second module associated with a second SIM; and
    means for receiving a second ACK message on the FPACH in response to the second synchronization message, the second ACK message being received after the first ACK message.

13. The apparatus of claim 11, further comprising:
    means for monitoring a first signal quality associated with the first SIM; and
    means for monitoring a second signal quality associated with a second SIM;
    the first synchronization message being transmitted when the first signal quality is better than the second signal quality.

14. A computer program product for wireless communications, the computer program product comprising:
    a non-transitory computer-readable medium having program code recorded thereon, the program code comprising:
    program code to transmit a first synchronization message from a first module associated with a first SIM;
    program code to receive a first acknowledgment (ACK) message on a fast physical access channel (FPACH) in response to the first synchronization message, the ACK message comprising at least timing information; and
    program code to share the timing information between the first module and a second module.

15. The computer program product of claim 14, further comprising:
    program code to transmit a second synchronization message from the second module associated with a second SIM; and
    program code to receive a second ACK message on the FPACH in response to the second synchronization message, the second ACK message being received after the first ACK message.

16. The computer program product of claim 14, further comprising:
    program code to monitor a first signal quality associated with the first SIM; and
    program code to monitor a second signal quality associated with a second SIM;

the first synchronization message being transmitted when the first signal quality is better than the second signal quality.

17. An apparatus for wireless communications, comprising:
a memory; and
at least one processor coupled to the memory, the at least one processor being configured:
to transmit a first synchronization message from a first module associated with a first SIM;
to receive a first acknowledgment (ACK) message on a fast physical access channel (FPACH) in response to the first synchronization message, the ACK message comprising at least timing information; and
to share the timing information between the first module and a second module.

18. The apparatus of claim 17, in which the at least one processor is further configured:
to transmit a second synchronization message from the second module associated with a second SIM; and
to receive a second ACK message on the FPACH in response to the second synchronization message, the second ACK message being received after the first ACK message.

19. The apparatus of claim 18, in which the first and second synchronization messages are simultaneously transmitted.

20. The apparatus of claim 19, in which the first and second synchronization messages use different synchronization codes.

21. The apparatus of claim 18, in which the first and second synchronization messages are transmitted at different times.

22. The apparatus of claim 18, in which the at least one processor is further configured to share the timing information when the first and second synchronization messages are simultaneously transmitted and when the first and second synchronization messages use similar synchronization codes.

23. The apparatus of claim 18, in which the at least one processor is further configured to alternate transmitting the first synchronization message and the second synchronization message.

24. The apparatus of claim 17, in which the at least one processor is further configured:
to monitor a first signal quality associated with the first SIM; and
to monitor a second signal quality associated with a second SIM, the first synchronization message being transmitted when the first signal quality is better than the second signal quality.

25. The apparatus of claim 17, in which the ACK message further includes power information; and
in which the at least one processor is further configured to adjust a transmission power for each SIM based at least in part on the received power information.

26. The apparatus of claim 17, in which the ACK message is a point to point message and/or a high level message.

* * * * *